United States Patent [19]

Weiss

[11] Patent Number: 5,479,512
[45] Date of Patent: Dec. 26, 1995

[54] METHOD AND APPARATUS FOR PERFORMING CONCRYPTION

[75] Inventor: Kenneth P. Weiss, Newton, Mass.

[73] Assignee: Security Dynamics Technologies, Inc., Cambridge, Mass.

[21] Appl. No.: 234,213

[22] Filed: Apr. 28, 1994

Related U.S. Application Data

[63] Continuation-in-part of Ser. No. 213,951, Mar. 16, 1994, and Ser. No. 67,517, May 25, 1993, which is a continuation-in-part of Ser. No. 923,085, Jul. 31, 1992, Pat. No. 5,367,572, and Ser. No. 712,186, Jun. 7, 1991, Pat. No. 5,237,614.

[51] Int. Cl.$^6$ ................................ H04L 9/28; H04L 9/00
[52] U.S. Cl. .................. 380/28; 380/9; 380/23; 380/25; 380/49; 235/380
[58] Field of Search .................. 380/4, 9, 21, 28, 380/43, 44, 46, 49, 50, 59, 30, 23, 25, 54; 235/380

[56] References Cited

U.S. PATENT DOCUMENTS

| | | | |
|---|---|---|---|
| 4,386,416 | 5/1983 | Giltner et al. | 380/49 X |
| 4,454,575 | 6/1984 | Bushan et al. | 380/49 X |
| 4,788,543 | 11/1988 | Rubin | 380/50 X |
| 4,893,339 | 1/1990 | Bright et al. | 380/28 |
| 5,150,410 | 9/1992 | Bertrand | 380/28 |
| 5,153,918 | 10/1992 | Tuai | 380/25 |
| 5,285,497 | 2/1994 | Thatcher, Jr. | 380/49 |
| 5,315,655 | 5/1994 | Chaplin | 380/4 |
| 5,321,749 | 6/1994 | Virga | 380/54 X |

*Primary Examiner*—Bernarr E. Gregory
*Attorney, Agent, or Firm*—Wolf, Greenfield & Sacks

[57] ABSTRACT

A method and apparatus for the integrated compression and encryption (concryption) of clear data and for the deconcryption of concrypted data to obtain the clear data for utilization. For concryption, the clear data and an encryption key are obtained, at least one compression step is performed and at least one encryption step is performed utilizing the encryption key. The encryption step is preferably performed on the final or intermediate results of a compression step, with compression being a multistep operation. For deconcryption, decompression and deencryption steps are performed on concrypted data in essentially the reverse order for the performance of corresponding compression and encryption steps during the concryption operation.

29 Claims, 3 Drawing Sheets

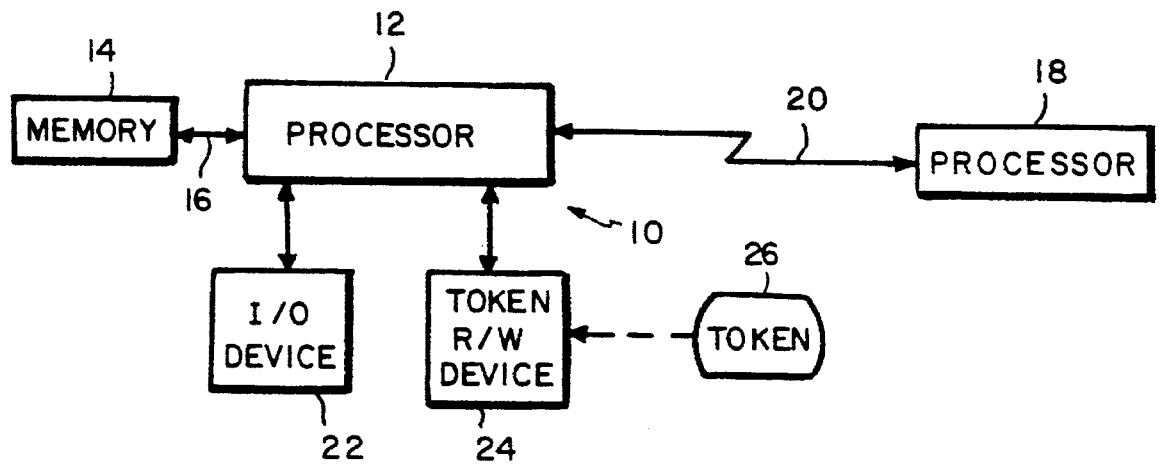
FIG. 1
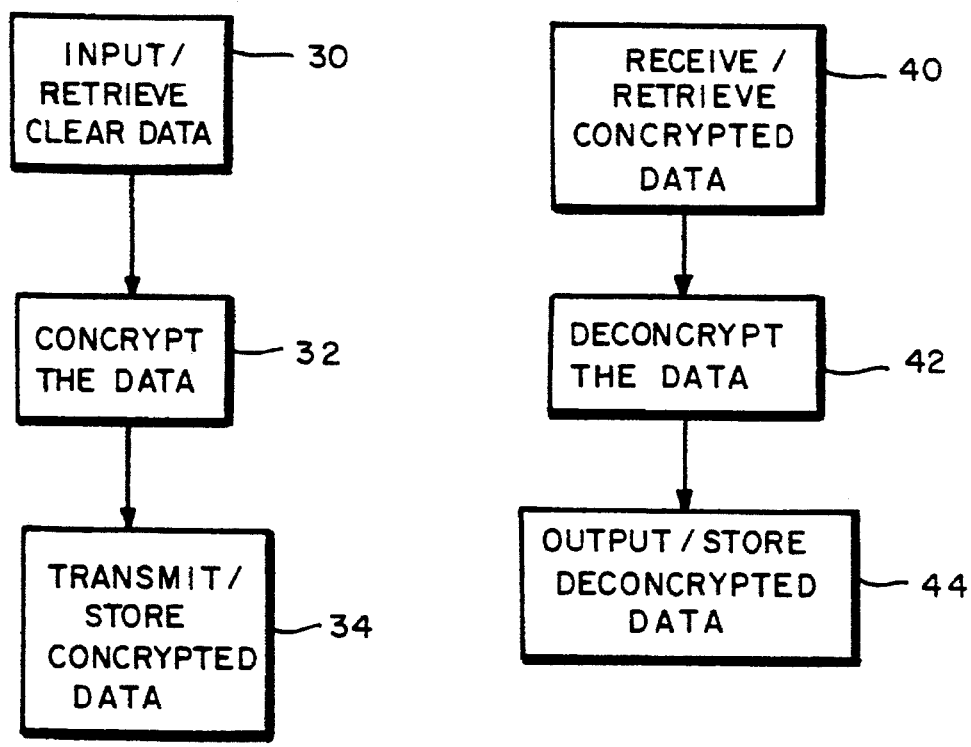
FIG. 2A
FIG. 2B

METHOD AND APPARATUS FOR PERFORMING CONCRYPTION

RELATED APPLICATIONS

This application is a continuation-in-part of U.S. patent application Ser. No. 08/067,517, filed May 25, 1993 for ENHANCED SECURITY FOR A SECURE TOKEN CODE (the '517 application), now pending and of U.S. patent application Ser. No. 08/213,951, filed Mar. 16, 1994 for METHOD AND APPARATUS FOR UTILIZING A TOKEN FOR RESOURCE ACCESS (the '951 application). The '517 application is a continuation-in-part of U.S. patent application Ser. No. 07/923,085, filed Jul. 31, 1992 for METHOD AND APPARATUS FOR PERSONAL IDENTIFICATION, now U.S. Pat. No. 5,367,572, and of U.S. patent application Ser. No. 07/712,186, filed Jun. 7, 1991 for INTEGRATED NETWORK SECURITY SYSTEM, now U.S. Pat. No. 5,237,614. The disclosures of these applications are incorporated by reference herein.

FIELD OF THE INVENTION

This invention relates to the processing of data from clear form to a compressed and encrypted form and to the restoring of the data to clear form for utilization.

BACKGROUND OF THE INVENTION

One byproduct of the "information age" is the huge amounts of data which are stored in various storage media and which are transmitted over various transmission media. In order to reduce the amount of storage media required, to reduce the time required to retrieve data and to reduce required transmission times and/or bandwidths, it has been a common practice for some years to use some form of compression on the raw or clear data before it is stored or transmitted. Depending on the nature of the data, the acceptable computation penalty and other factors, compression ratios in excess of two to one can be achieved for relatively simple systems, with far higher compression ratios being available for more sophisticated compression techniques, such as where two or more compression techniques are chained. For example, when text data is to be transmitted, a run-length encoding (RLE) technique may be utilized to eliminate, or reduce the transmission bandwidth for all of the white spaces around the actual text and the actual text may then be further compressed by using a compression algorithm such as Huffman encoding, Lemple-Ziv (LZ) encoding, one of the many variations on LZ encoding such as Lemple-Ziv-Walsh (LZW) or a combination of two or more such compression techniques. When the data is retrieved from memory, or at the receiving end of a transmission, the data may be decompressed for utilization.

Another problem with the huge quantity of data currently available, particularly where the computer systems storing/utilizing the data are networked, is that data may be and frequently is surreptitiously observed or obtained by unauthorized people or organizations. Where the data is stored or transmitted in compressed form, the information obtained by unauthorized accessing of memory or transmission media cannot be utilized in the form obtained; however, compression algorithms which are usually publicly available or specified in advance, do not therefore provide security for the data. Even if compression algorithms were not known, they are not secure since they work on redundancy and the basis used for cryptographic code breaking is the detection and analyzing of redundant information. Therefore, compression alone, regardless of the degree of sophistication, is not much of a challenge to decipher for experienced cryptanalysts.

Therefore, it is desirable that valuable or sensitive information which is to be stored or transmitted be stored or transmitted in encrypted form. However, both encryption and compression are time and computer cycle intensive. Therefore, the independent, sequential performance of compression and encryption as separate operations on clear data before storage or transmission, and the reversing of these processes to permit utilization of the data, places an added burden on the data processing system performing these functions which may significantly increase the response time of the system to service requests and/or require the use of more powerful and therefore more expensive processing equipment. It would therefore be desirable if encryption and compression could be integrated so as to be automatically performed together as a single concryption operation, the term "concryption" being sometimes used hereinafter to refer to the integrated performance of compression and encryption on data, with a performance penalty for the combined operation which is reduced so as to be more comparable to either technology being performed separately than to that involved in performing the two technologies as separate functions.

SUMMARY OF THE INVENTION

In accordance with the teachings of this invention, concryption is performed on clear data by a data processing device as part of a single operation rather than as two separate operations. More specifically, once the data is loaded into the data processing system, the operations of compression and encryption are performed in an integrated fashion as part of a single operation with reduced memory and/or storage access. Since loading data from memory into a computer and restoring the data to storage are time-consuming operations, performing concryption with a reduced memory and/or storage access results in a significant reduction in the performance penalty for performing the two operations without regard to savings which may also be effected as a result of the algorithmic integration of these operations.

More particularly, clear data is received at the processor, for example as the result of being generated by the processor, of a memory readout or of receipt over a transmission line, and a concryption operation is performed on the clear data, which operation includes at least one compression step and air least one encryption step, which steps are automatically performed in a selected sequence. For preferred embodiments, the compression operation is a multistep operation with the encryption being performed on the results of a compression step and/or on an element utilized in performing at least one compression step. The concrypted data may be outputted either by storing this data in a memory/storage media, by transmitting the concrypted data or by utilizing this data in another suitable manner. When the concrypted data is to be deconcrypted to permit use thereof in clear form, deconcrypting is performed utilizing at least one decompression step and at least one deencryption step, which steps are performed automatically in a sequence which is substantially the reverse of the selected sequence in which compression and encryption, respectively, are performed during the concryption operation.

For preferred embodiments, the encryption key is a code derived from a card or other token carried by an authorized user. Techniques for providing enhanced security for a static code or key stored in such token are discussed in some of the parent applications. While enhanced security may be obtained, particularly for transmitted data, if such encryption key is a one-time code or time-varying value, the use of such an encryption key can cause problems with stored data, particularly when such data is stored at different times. Therefore, either a static key is used for stored data or an indication is stored with such data which permits the appropriate one-time code which was used for the storage of such data to be determined.

For some embodiments of the invention, the encryption step includes dividing the results of a selected compression step into a plurality of blocks or segments, selecting an encryption key for each segment and performing an encryption operation for each segment utilizing the corresponding encryption key. The selected encryption key may be the same for all of the segments or a received encryption key may be processed to form a separate encryption key for each segment. In particular, a predefined permutation table may for example be utilized for modifying the received key to operate on the various segments. Alternatively, the received encryption key may be used To perform encryption on a first of the segments with a selected function of at least a portion of the encryption output or a function thereof for a given segment being utilized as the encryption key for performing an encryption operation on a succeeding segment. Where for example the text is data, a segment may be N lines of such text. Encryption may also be performed on an element such as a tabular value utilized in performing the compression operation or on only a selected portion of the compressed data. The encrypted element may be transmitted to a receiving location to permit deencryption thereat.

For preferred embodiments, the encryption operation is performed by exclusive ORing the encryption key with the results of the selected step or the segment thereof. Similarly, the encryption key may be formed by exclusive ORing a password for a system user with a code derived from a token in the possession of the user as taught in the '517 application. Such exclusive ORing operation may be performed at the processor doing the encryption, at the token, or at some intermediate processing element.

The foregoing and other objects, features and advantages of the invention will be apparent from the following more particular description of preferred embodiments of the invention as illustrated in the accompanying drawings.

IN THE DRAWINGS

FIG. 1 is a block schematic diagram of a system in which the invention may be practiced.

FIGS. 2A and 2B are simplified flow diagrams of the concryption and deconcryption process, respectively.

DETAILED DESCRIPTION

Figure 3A:
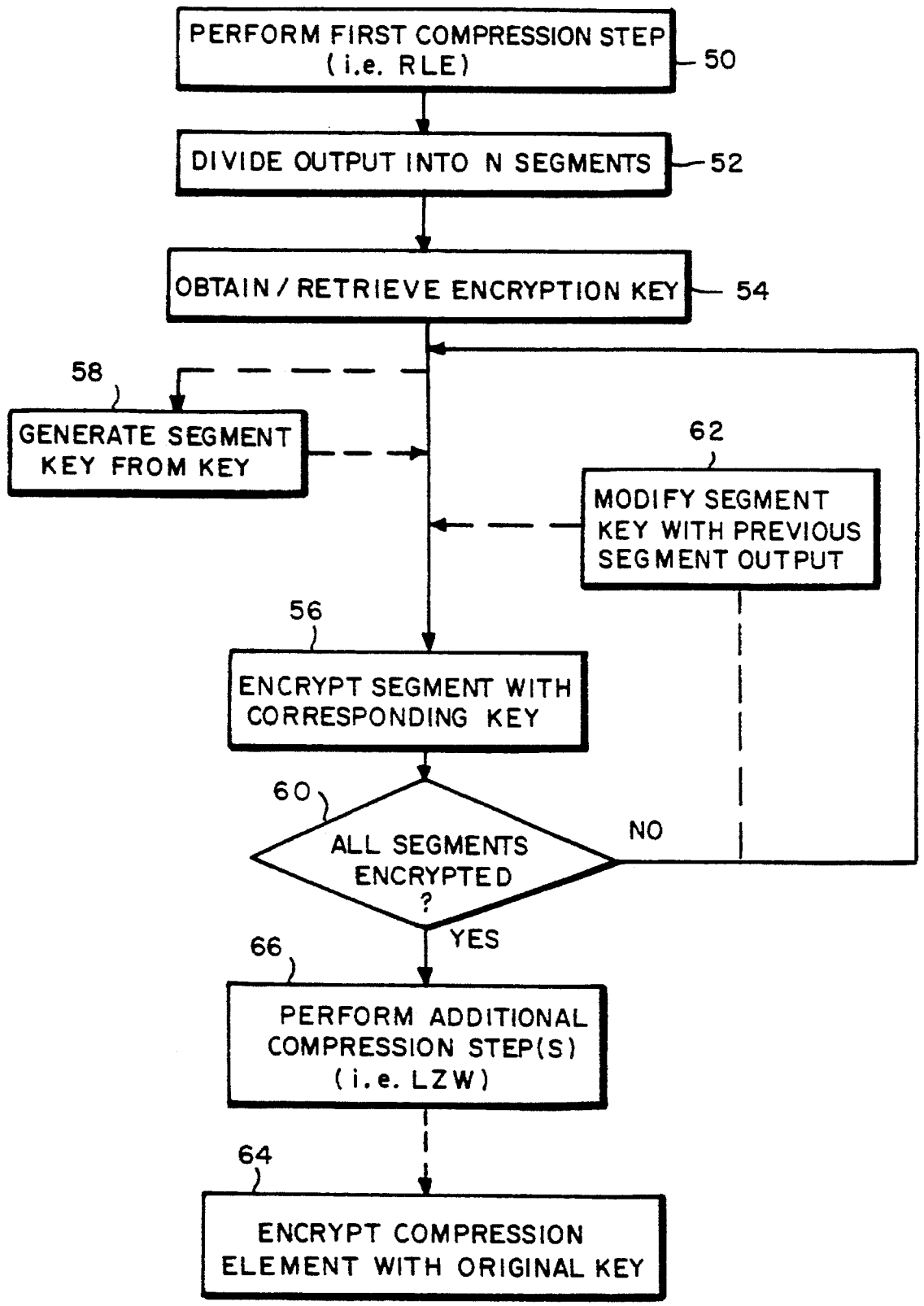
FIGS. 3A and 3B are more detailed flow diagrams of the "Concrypt the Data" and the "Deconcrypt the Data" steps of FIGS. 2A and 2B, respectively.

FIG. 1 is a block diagram of an exemplary system 10 in which the teachings of this invention may be employed. The system includes a processor 12 which communicates with a bulk storage memory 14 over a line 16 and communicates with other processors, such as processor 18, over a transmission media 20. Transmission media 20 may for example be a network with processors 12 and 18 being two of the processors on such network. Each processor may have its own bulk memory 14 or processor 12 may be a server at a central location where protected data is located with other processors 18 receiving data from one or more bulk memories 14 over network 20 through server 12.

In such a system, it may be desirable to compress data before storing it in bulk memory 14 to reduce the size of the memory 14 required to store a given volume of data.. Reducing the size of the memories 14 may also reduce the time required to locate and retrieve data. Further, particularly where processor 12 and memory 14 are on a network, where other individuals and organizations on the network may gain access to processor 12 and memory 14, and may be able to secure unauthorized access to data stored in memory 14, it is desirable that the information stored in memory 14 be stored in encrypted form, using for example the DES (data encryption standard) protocol to encrypt the data, so that anyone surreptitiously coming into possession of the data would not be able to convert the data to clear form for use. Thus, it is desirable in many situations that the processor 12 compress and encrypt data to be stored in memory 14 and reverse these processes when the data is read out from memory 14 to be used.

Similarly, when data is put out on transmission medium or network 20, it is desirable that this data be transmitted in compressed form to reduce the bandwidth requirements of the line. This is particularly true where large amounts of data are being transmitted since the bandwidth available on a particular transmission medium may be limited and the cost penalty for obtaining greater bandwidth availability may be substantial. Reducing the volume of data which must be transmitted in order to convey selected data also speeds up the transmission process, permitting much greater amounts of data to be transmitted during a given period of time.

Further, the same problems which made it desirable to encrypt sensitive data being stored in memory 14 apply even more so when such data is being transmitted over a transmission medium where surreptitious eavesdropping is always possible. Concryption (i.e. both compression and encryption of data) is therefore also desirable for data being transmitted by processor 12 over a transmission medium.

However, in either case, or in other situations where concryption may be desirable, there is a substantial overhead penalty. The reason and the nature for this overhead penalty have been discussed earlier as has the desirability of reducing this penalty by automatically integrating the concryption process so as to facilitate the performance of such function as a single set of operations involving reduced memory access.

FIG. 2A is a simplified block diagram of the concryption process which involves three basic steps. The first step, step 30, is to generate or receive (i.e., input or retrieve) the data in clear form at processor 12. Data may be received in clear form at processor 12 from a variety of sources, including from other processors over media 20, from a variety of input/output devices 22 which may be associated with processor 12 (i.e. a keyboard, mouse, touch screen display, a modem which may be fed by media 20 or from a separate telephone line, etc.) or from other sources of data known in the art. Inputs may also be received from a token read/write device 24 which is adapted to read a suitable card or other token 26. Examples of suitable tokens and token R/W devices are provided in the '951 application.

Processor 12 either automatically concrypts all data which is received, or all data received from a particular source before storing it in for example memory 14, or the concryption operation on inputted information or information read out from a memory associated with processor 12 may be performed on data only in response to an instruction that the specific data be concrypted. In any of these events, processor 12 concrypts the data during step 32 and then outputs the concrypted data during step 34 over line 16 to memory 14, over transmission medium 20 to another processor 18, or to some other component to which the data is to be outputted.

Similarly, referring to FIG. 2B, when processor 12 retrieves or receives concrypted data, for example from memory 14 over lines 16 or from processor 18 over transmission medium 20, the processor deconcrypts the data during step 42 and outputs/stores the clear data during step 44. The outputted clear data may be utilized by processor 12 for performing selected operations, or may be outputted to some other component for storage or use at such component.

FIG. 3A is a flow diagram of an exemplary concryption step 32. The exact manner in which this step is performed will vary with application. In particular, a variety of compression techniques may be utilized depending on the nature of the data, and for many types of data, two or more compression techniques may be chained in order to obtain optimum data compression. Similarly, the particular encryption technique which is employed will also vary with application. Thus, the manner in which the compression and encryption operations are integrated will also vary with application so as to permit the desired reduction in computational burden to be achieved without a significant degradation in the efficiency of either the compression or encryption operations. Several ways of achieving these results are illustrated in FIG. 3A; however, it should be understood that these techniques are provided by way of example only, that many other compression and/or encryption techniques might be utilized in practicing the teachings of this invention and that such techniques might be integrated in a variety of ways which will vary with the particular compression and encryption techniques being utilized.

For the illustrative embodiment, the first step in the concryption operation is to perform a first compression step (step 50). For example, where the data being compressed is textual data, an initial run length encoding (RLE) step may be performed to remove blank spaces surrounding the text and within the text. Where the received data is pure text, the first step might be compression using one of the Lemple-Ziv (LZ) compression techniques such as the Lemple-Ziv-Walsh (LZW) procedure. While for preferred embodiments step 50 is the complete running of a particular compression procedure, step 50 could also involve the performance of a particular compression procedure up to some intermediate point in the performance of such procedure, with the procedure being completed during subsequent compression steps to be discussed later.

From step 50, the operation proceeds to step 52 to divide the results of step 50 into N segments, where N is preferably an integer. Where N is one, step 52 may be dispensed with; however, since encryption is usually performed on successive subsets of received data, some form of step 52 will normally be required. Step 52 may also be performed as part of compression step 50 where compression is performed on some finite subset of the data, or the output from step 50 may be divided into a plurality of segments for purposes of performing an encryption operation.

During step 54, an encryption key is received at processor 12. This key may be stored in the processor or may be inputted on a suitable input device by the user. For example, the user may have a token of the type described in the '951 application, which token contains the encryption key and is inserted into a suitable reader at processor 12, or both a value read from a token in the possession of the user and a PIN or other personal identification code known only to the user may be inputted on a keyboard or other suitable input device and utilized in processor 12 in conjunction with the inputted token code, and perhaps other inputted values in the manner described in the '951 application, to generate the encryption key.

In some applications, the encryption key is a one-time code which is generated for example in the manner described in the '951 application. Briefly, such one-time code may be generated by adding a clock value as an additional input to the algorithm which generates the encryption key or by using the output from each key generation operation, or some intermediate function involving the generation thereof as the value stored in the token in place of the previously stored value. Other techniques for generating one-time codes are also discussed in the application. The advantage of using a one-time code as the encryption key is that it enhances security. While this may be usable where the data is being transmitted over for example network 20, it may not be feasible where information is stored in memory 14. This is because it would be difficult to retrieve the proper encryption key for data which had been stored at different times and the process of deencryption would therefore be more difficult. One solution to this problem might be to store with data a time marker or sequence pointer which might be utilized to permit the appropriate encryption/deencryption key to be generated or retrieved for a particular type of data.

From step 54, there are a number of options. The first and simplest option is to utilize a single encryption key, for example that received during step 54, to encrypt all of the segments during step 56. Where there is only a single segment (i.e. N=1), this would of course always be the case. However, one preferred technique for performing encryption is to exclusive OR the data to be encrypted with the encryption key. Where the encryption key is much shorter than the data to be encrypted, such an exclusive ORing operation might involve replicating the received encryption key a sufficient number of times so as to permit the exclusive ORing operation to be performed for the received data (i.e. if the encryption key is 64 bits and a single line is 256 bits, the encryption key would have to be reproduced four times end-to-end to permit exclusive ORing to be performed on all of the bits of the partially compressed input). In this case, each 64 bits could be considered to be a segment and process step 58 to obtain a key for each segment would merely involve reproducing the original key a sufficient number of times to provide the encryption key for each segment. Alternatively, the key used for encryption for each segment may be obtained by modifying the received key according to a predefined permutation table. Other techniques known in the art for obtaining a corresponding key during step 58 for each segment for the encryption operation to be performed during step 56 might also be utilized.

Another possibility is that encryption be a chaining operation. This procedure is advantageous in that if one bit changes at any point in the procedure, it throws the entire document or record off, thereby assuring the integrity of the document. With this procedure, step 56 would be performed for example with the received encryption key being exclusive ORed with the first segment. The operation would then proceed to step 60 to determine if all segments have been encrypted. If all segments have not been encrypted, the operation proceeds to step 62 during which a new key is generated from the output of step 56. This new key could be an intermediate value or some portion of the output value generated during step 56. This value is then applied as the encryption key for the performance of step 56 on the next segment, and this chaining sequence of operations is repeated until, during step 60, a "yes" output is obtained, indicating that all segments have been encrypted. While the technique described above may be utilized to break a line up into segments having a predetermined number of bits, the segments may also be made up of a number of lines each, with the chained encryption code being utilized for successive groups of lines to insure data integrity.

Once encryption has been completed, regardless of how it is performed, the operation proceeds to step 66 to complete the compression process by performing additional compression steps. Step 66 may be optional in that where there is only a single compression step and it is completed during step 50, step 66 would not be performed. Also, as discussed above, step 66 may be the completion of a compression process which is only partially completed during step 50 and/or may be one or more additional compression processes which is/are performed on the clear data. For example, in the example previously given where step 50 involves RLE compression, step 66 may involve an LZW compression and/or some form of Huffman compression. Other compression techniques may be utilized during step 66 as appropriate. When step 66 is completed, the concryption step 38 of FIG. 2A is generally completed and the operation proceeds to step 34 to output the concrypted data.

FIG. 3A illustrates as an optional step, step 64 which may be performed as required at various points in the operation. This step may be required for certain types of compression algorithms such as Huffman encoding where the same table at both the sending and receiving locations are required to permit transmitted data to be decompressed. During step 64 such tables, or other elements required for compression, are encrypted, utilizing a suitable key, for transmission, preferably prior to the transmission of the data. Further, while typically encryption would be done on the received data or on all or a selection portion of the results of some stage of the encryption process, it is also possible, as illustrated by step 64, for encryption to be performed on some table or other element which is utilized in the compression process either in addition to or instead of being utilized on the results of some stage in this process.

Figure 3B:
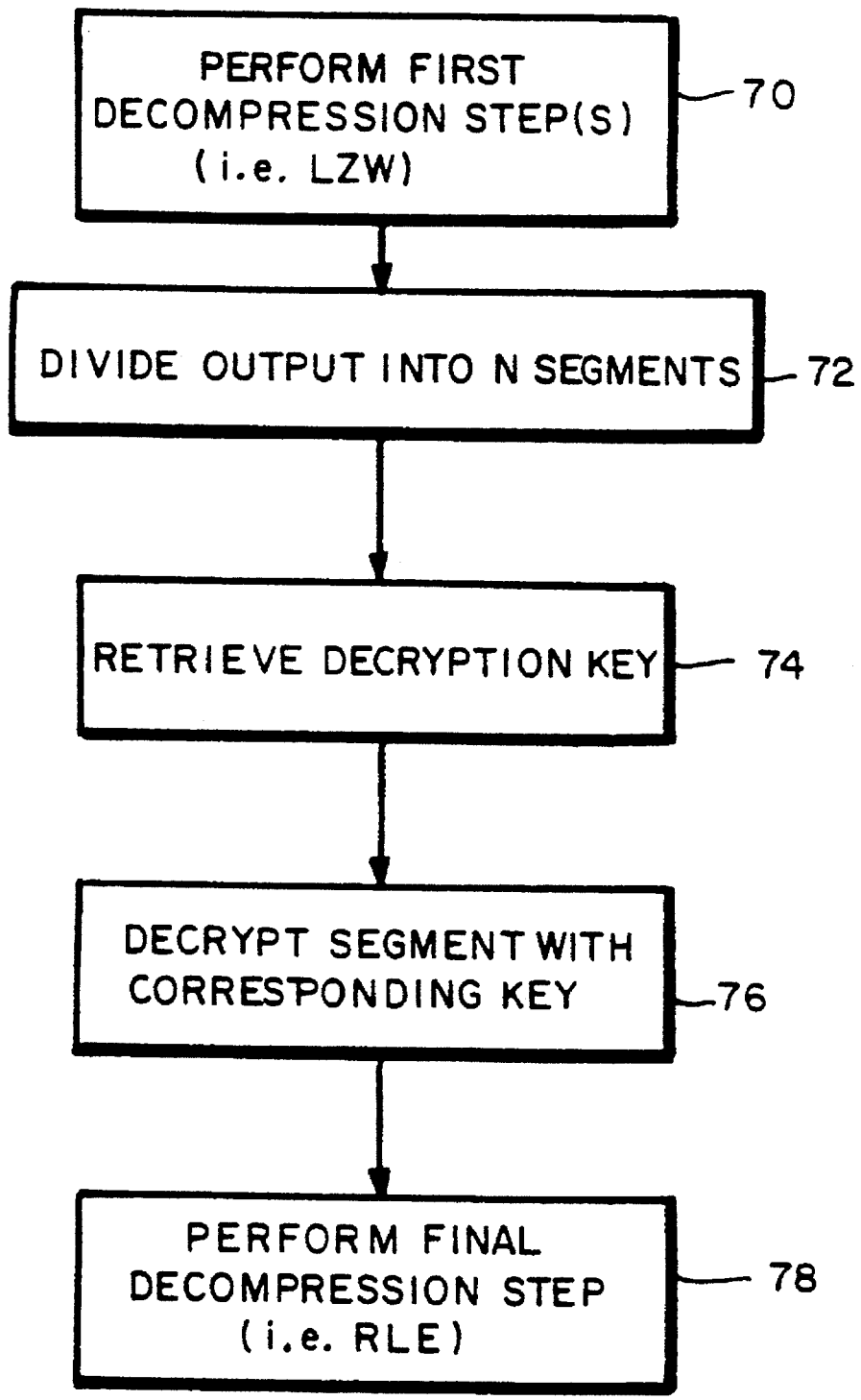

As previously discussed, deconcryption step 42 (FIG. 2B) is basically the mirror image of the concryption step 32. FIG. 3B shows an illustrative sequence of operations for deconcryption step 42, the sequence of operations being for one of the simpler forms of concryption available using the techniques of FIG. 3A. Referring to FIG. 3B, the received concrypted data initially has decompression steps performed on it during step 70, which steps are performed in the reverse order of the compression steps performed during step 66. The output from step 70 is thus substantially identical to the input which was provided to step 66 during the concryption operation.

This output is divided into N segments during step 72, these segments being the same segments into which the results of the initial compression step were divided during step 52.

During step 74 one or more encryption keys are either received, retrieved or generated which correspond to the encryption keys which are inputted during step 56 and during step 76 these encryption keys are utilized to deencrypt corresponding segments which are formed during step 72. The deencrypted segments are then combined and a final decompression step 78 is performed, which step corresponds to the first compression step 50 of the concryption operation. The resulting deconcrypted clear data is then outputted during step 44 (FIG. 2B).

A process has thus been provided which permits for the integrated compression and encryption of data thereby reducing the processing penalty which is incurred when these operations are performed separately. While the invention has been particularly shown and described above with reference to various preferred embodiments, it is apparent that both the hardware and software disclosed are by way of illustration only, that many variations, some of which are discussed, are possible. For example, while only a single encryption step has been shown for some preferred embodiments, two or more encryption steps are possible in FIG. 3A and encryption may be performed at one or more places in the compression process, as required or desired. The encryption burden may be further reduced for some compression and/or encryption procedures by encrypting only selected portions of the compression output rather than all of such output. Further, while for the sake of reduced computation burden, it is generally desirable to do a compression step before doing encryption, for at least some applications, the first step in concryption could be an encryption step. Thus, while the invention has been particularly shown and described above with reference to various embodiments, the foregoing and other changes in form and detail may be made therein by one skilled in the art without departing from the spirit and scope of the invention.

What is claimed is:

1. A method for utilizing a data processor to change the form of data comprising the steps of:

a) obtaining the data at the processor in clear form;

b) obtaining an encryption key at the processor;

c) the processor performing a multi-step compression operation on said clear-form data;

d) the processor automatically utilizing said encryption key in conjunction with the results as directly generated by the processor for a selected step of said compression operation in performing an encryption operation, the compression steps of step (c) and the encryption step of step (d) being integrated to be performed as parts of a single operation; and e) the processor outputting the resulting compressed and encrypted version of the clear-form data.

2. A method as claimed in claim 1 wherein step (e) includes the step, of storing the resulting compressed and encrypted data in memory.

3. A method as claimed in claim 1 wherein step (e) includes the step of transmitting the resulting compressed and encrypted data.

4. A method as claimed in claim 1 wherein said encryption key is a code derived from a token.

5. A method as claimed in claim 4 wherein the code derived from a token is a one-time nonpredictable code.

6. A method as claimed in claim 1 wherein step (d) includes the steps performed by the processor of dividing the results of the selected step of the compression operation into a plurality of segments, selecting an encryption key for each segment and performing an encryption operation for each segment utilizing the corresponding encryption key.

7. A method as claimed in claim 6 wherein the step of selecting an encryption key includes the step of processing the obtained encryption key to form a separate encryption key for each of the plurality of segments.

8. A method as claimed in claim 6 wherein the step of selecting an encryption key includes the step of utilizing the same encryption key for all segments.

9. A method as claimed in claim 1 wherein step (d) includes the steps performed by the processor of dividing the results of the selected step of the compression operation into a plurality of segments, utilizing the obtained encryption key to perform an encryption operation for a first of said segments, and utilizing a selected function of at least a portion of the encryption operation for a given segment as the encryption key for performing an encryption operation on a succeeding segment.

10. A method as claimed in claim 9 wherein the data is text and wherein a segment is N lines of such text, where N is an integer.

11. A method as claimed in claim 1 wherein the encryption operation includes the step of the processor performing an exclusive ORing operation with the encryption key and the results of the selected step.

12. A method as claimed in claim 1 wherein step (b) includes the step of forming the encryption key by exclusive ORing a password for a system user with a code derived from a token in the possession of the user.

13. A method as claimed in claim 1 wherein step (c) includes the step of the processor performing an initial run-length encoding operation on the clear-form data and wherein step (d) is performed on the results of the run-length encoding step.

14. A method as claimed in claim 1 wherein step (d) is performed on at least one element used in a compression step.

15. A method as claimed in claim 14 wherein the element on which encryption is performed is a table used in performing a compression step.

16. A method as claimed in claim 1 including the step of restoring the data to clear form for utilization, said restoring step including the steps of performing at least one decompression operation and at least one deencryption operation, said decompression and deencryption steps being performed in reverse order to the performance of steps (c) and (d).

17. A method for utilizing a data processor to concrypt data comprising the steps of:

the processor obtaining the data in clear form;
the processor performing a concryption operation on the clear data, said concryption operation including at least one compression step and at least one encryption step automatically performed in a selected sequence as an integral operation; and
the processor outputting the resulting concrypted data.

18. A method as claimed in claim 17 including the step performed at a data processor of deconcrypting the concrypted data to permit use thereof in clear form, the deconcrypting step including at least one decompression step and at least one deencryption step performed automatically in a sequence which is substantially the reverse of said selected sequence.

19. A method as claimed in claim 17 wherein an encryption step is performed on the results of at least one stage of a compression step.

20. A method as claimed in claim 17 wherein an encryption step is performed on at least one element used in a compression step.

21. Apparatus for utilizing a data processor to change the form of data comprising:

means for obtaining the data at the processor in clear form;
means for obtaining an encryption key at the processor;
means for performing at the processor a multi-step compression operation on said clear-form data;
means at the processor for automatically utilizing said encryption key in conjunction with the results as directly generated by the processor for a selected step of said compression operation in performing an encryption operation, the compression performed by the compression means and the encryption performed by the encryption means being integrated to be performed as parts of the same operations; and
means at the processor for outputting the resulting compressed and encrypted version of the clear-form data.

22. Apparatus as claimed in claim 21 wherein the means for performing an encryption operation includes means at the processor for dividing the results of the selected step of the compression operation into a plurality of segments, and means for performing an encryption operation for each segment utilizing the corresponding encryption key.

23. Apparatus as claimed in claim 22 wherein the means for selecting an encryption key includes means for processing the obtained encryption key to form a separate encryption key for each of the plurality of segments.

24. Apparatus as claimed in claim 21 wherein the means for performing an encryption operation includes means at the processor for dividing the results of the selected step of the compression operation into a plurality of segments, means for utilizing the obtained encryption key to perform an encryption operation for a first of said segments, and means for utilizing a selected function of at least a portion of the encryption operation for a given segment as the encryption key for performing an encryption operation on a succeeding segment.

25. Apparatus as claimed in claim 21 wherein the means for performing an encryption operation includes means at the processor for performing an exclusive ORing operation with the encryption key and the results of the selected step.

26. Apparatus as claimed in claim 21 wherein the means for performing a multistep compression operation includes means at the processor for performing an initial run-length encoding operation on the clear-form data; and wherein the encryption operation is performed on the results of the run-length encoding operation.

27. Apparatus as claimed in claim 21 including means for restoring the data to clear form for utilization, said means for restoring including means for performing at least one decompression operation and at least one deencryption operation, said decompression and deencryption operations being performed in reverse order to the performance of compression and encryption by said means for compressing and said means for encrypting, respectively.

28. Apparatus for utilizing a data processor to concrypt data comprising:

means for obtaining the data at the processor in clear form;

means for performing a concryption operation at the processor on the clear data, said concryption operation including means for performing at least one compression step and means for performing at least one encryption step, said compression and encryption steps being automatically performed in a selected sequence as an integrated operation; and means for the processor outputting the resulting concrypted data.

29. Apparatus as claimed in claim 28 including means at a data processor for deconcrypting the concrypted data to permit use thereof in clear form, the means for deconcrypting including means for performing at least one decompression step and means for performing at least one deencryption step; the decompression and deencryption steps being performed automatically in a sequence which is substantially the reverse of said selected sequence.

\* \* \* \* \*